US006547916B1

(12) United States Patent
Andersson et al.

(10) Patent No.: US 6,547,916 B1
(45) Date of Patent: Apr. 15, 2003

(54) METHOD OF JOINING SURFACES

(75) Inventors: Sven-Erik Andersson, Nacka (SE);
Ben Nasli-Bakir, Saltsjö-Boo (SE);
Stefan Lindberg, Vallentuna (SE);
Olov Österberg, Täby (SE)

(73) Assignee: Akzo Nobel N.V., Arnham (NL)

( * ) Notice: Subject to any disclaimer, the term of this patent is extended or adjusted under 35 U.S.C. 154(b) by 0 days.

(21) Appl. No.: 09/647,214

(22) PCT Filed: Mar. 29, 1999

(86) PCT No.: PCT/SE99/00510

§ 371 (c)(1),
(2), (4) Date: Sep. 28, 2000

(87) PCT Pub. No.: WO99/51697

PCT Pub. Date: Oct. 14, 1999

(30) Foreign Application Priority Data

Apr. 6, 1998 (EP) .............................................. 98850049

(51) Int. Cl.[7] .................................................. C09J 5/04
(52) U.S. Cl. ............... 156/314; 106/286.8; 106/287.26; 156/319; 252/182.32
(58) Field of Search ................................. 156/314, 319; 252/182.32; 106/286.8, 287.26

(56) References Cited

U.S. PATENT DOCUMENTS 4,061,620 A     12/1977   Gillern ....................... 260/29.3
5,000,870 A   *   3/1991   Shimizu ................ 252/182.32

FOREIGN PATENT DOCUMENTS

JP          52-32975   *   3/1977  .................. 156/314

* cited by examiner

*Primary Examiner*—John J. Gallagher
(74) *Attorney, Agent, or Firm*—David J. Serbin

(57) ABSTRACT

A method of joining cellulosic fiber containing surfaces by means of a phenolic, phenol-resorcinol, or resorcinol resin based adhesive system, whereby at least one of the surfaces is treated with a cure promoter composition comprising a carbonate, prior to the adhesive system being applied and a cure promoter composition for phenolic resin based on resorcinol resin based adhesive system comprising a carbonate.

27 Claims, No Drawings

METHOD OF JOINING SURFACES

The present invention relates to a method of joining cellulosic fibre containing surfaces by means of a phenolic resin, phenol-resorcinol, or resorcinol resin based adhesive system whereby at least one of the surfaces is treated with a cure promoter composition prior to application of the adhesive system. It also relates to a cure promoter composition for a phenolic resin, phenol-resorcinol, or resorcinol resin based adhesive system.

A "cure promoter" is a substance, i.e. a Compound or a composition, which increases the curing rate of an adhesive on forming of the joint. It should be distinguished from "hardeners" and "curing agents", which are substances used to initiate the curing process of an adhesive system. The cure promoter is in the form of a fluid.

Phenolic resin (Chemical Abstracts Service Registry Number 9003-35-4) based and resorcinol resin (Chemical Abstracts Service Registry Number 24969-11-7) based adhesive system are described, for instance, in "Ullman's Encyclopaedia of Industrial Chemistry", 5th edition, Volume A 1, page 230 (1985). Phenol-resorcinol resin such as phenol-resorcinol-formaldehyde (PRF) adhesives, are for example described in U.S. Pat. No. 4,061,620.

Resorcinol resin and phenol-resorcinol resin adhesives can generally be cured at both low and elevated temperatures, whereas phenolic resin adhesives can generally only be cured at elevated temperatures, i.e. $T \geq 100°$ C. The molar ratio of formaldehyde:phenol-resorcinol and formaldehyde:resorcinol (hereinafter both referred as HCHO:ArOH) is generally $\leq 0.80$ for phenol-resorcinol and resorcinol resin adhesives, while the molar ratio of formaldehyde:phenol (hereinafter referred as HCHO:PhOH) for phenolic resin adhesives is generally $\geq 1.0$.

By an "adhesive system" is herein meant a curing formulation of a resin and a hardener or a curing agent.

A "cellulosic fibre containing surface" may in the present context be a surface substantially defined by fibres of cellulose or one or more cellulose derivatives, or combinations thereof. Examples of cellulosic fibre containing surfaces are the surfaces of wood based panels, paper or paperboard. The term "wood based panel" comprises, inter alia, plywood, particleboards, flakeboards, fibreboards, such as hardboards and medium density fibreboards (MDF). The present invention also covers embodiments in which only a thin surface stratum contains cellulosic fibres, the stratum being applied on the surface of an object of a basically non-cellulosic nature.

EP 493,010 discloses a method belonging to the general technical field indicated in the introduction. Pieces of unseasoned wood are joined by means of an adhesive formulation, whereby a cure promoter is brought into contact with the adhesive. Formaldehyde based adhesives are said to be preferred, and phenol and resorcinol are indicated as examples of components that may be used in such adhesives. Lewis and Bronsted acids are among the cure promoters mentioned specifically organic acids of low molecular weight. Basic chemicals (pH>7) which will react on contact with the adhesive to change the nature of a conventional adhesive to a fast curing adhesive are indicated to constitute a preferred class of cure promoters. Sodium periodate is also used in one of the examples.

These specific promoter chemicals indicated in EP 493,010 are all burdened by serious disadvantages, such as being poisonous, e.g. chromic acid, zinc salts, and aluminium salts, or giving rise to odour problems, e.g. ammonia, amines and amine derivatives, or both, e.g. formic acid and trichloroacetic acid. Sodium periodate is known to be a strong oxidising agent, giving rise to severe fire hazards.

It has also been found that when ammonia or an amine or an amine derivative is used as cure promoter the exact dosing of the promoter chemical is extremely critical; even at a minor overdose of the promoter the curing of the resin will be premature, as it will cure before it has penetrated the wood sufficiently to provide a durable joint between the surfaces.

The present invention accordingly provides a method of joining cellulocic fibre containing surfaces and a cure promoter composition suitable for use in the method, by which enhanced adhesive and strength properties are obtained and at the same time the above mentioned problems can be overcome.

The claimed method relates to joining of cellulosic fibre containing surfaces by means of a phenolic, phenol-resorcinol, or resorcinol resin based adhesive system, whereby at least one of the surfaces is treated with a cure promoter prior to the adhesive system being applied, in which method a cure promoter comprising a carbonate is used.

The surface treated with the cure promoter composition may, for instance, be the surface of a wood based panel or the surface of a paper or a paperboard. The wood based panel may for instance be a particleboard, flakeboard, hardboard, fibreboard, specifically a medium density fibreboard (MDF), or be made of plywood, although this listing is not exhaustive.

Suitable adhesive systems for use in the present invention are those based on phenolic, phenol-resorcinol, or resorcinol resins, and preferably those based on phenol-resorcinol, or resorcinol resins. The HCHO:ArOH molar ratio of the phenol-resorcinol and resorcinol resin component of the adhesive system is suitably 0.4:1 to 0.8:1, preferably 0.45:1 to 0.75:1 and most preferably 0.50:1 to 0.70:1. The resorcinol:phenol molar ratio of the phenol-resorcinol resin component of the adhesive system is suitably 1:0–1:1, preferably 9:1–0.15:1 and most preferably 7:1–0.25:1.

The adhesive systems used in the claimed method are cured at a temperature of suitably 10 to 100° C., preferably 15 to 80° C. and most preferably at about room temperature, for instance at 20 to 40° C.

The cure promoter composition according to the present invention for a phenolic, phenol-resorcinol, or resorcinol resin based adhesive system comprises a carbonate.

The carbonate is preferably a water-soluble salt of carbonic acid, such as for instance $Na_2CO_3$, $NaHCO_3$, $K_2CO_3$, $KHCO_3$, $(NH_4)_2CO_3$, or $NH_4HCO_3$. The also be a combination of two or more water-soluble carbonic acid salts. The cure promoter composition suitably comprises 0.5–45 weight percent water soluble carbonic acid salt, preferably 5–40 weight percent and most preferably 10–35 weight percent, based on the total weight of the cure promoter composition.

In one embodiment the carbonate is 1,3-dioxolan-2-one (Chemical Abstracts Service Registry Number 96-49-1) or a higher homolog thereof, such as for instance 4-methyl-1,3-dioxolan-2-one (Chemical Abstracts Service Registry Number 108-32-7), or a combination thereof. The carbonate may also be a combination of 1,3-dioxolan-2-one, or a higher homolog thereof, and one and more water-soluble carbonic acid salts, for instance one or more of the salts indicated above.

Preferably, the present cure promoter composition additionally comprises a base, in particular an alkali. By "alkali"

is meant water soluble hydroxides of alkali metals and alkaline earths, in particular Li, K, Na, Rb, Cs, and Ca. Preferably, the alkali is NaOH or KOH. The alkali is suitably used in an amount of up to about 30 percent by weight, based on the total weight of the cure promoter composition, preferably up to about 10 percent by weight and most preferably up to about 5 percent by weight.

The present cure promoter composition may additionally comprise a water retaining and viscosity regulating agent, such as for instance polyvinyl alcohol, hydroxy ethyl cellulose, carboxy methyl cellulose, ethylene glycol, polyethylene glycol, propylene glycol, polypropylene glycol, or a combination thereof.

Preferably, the present cure promoter composition is substantially formaldehyde and/or resorcinol free and most preferably substantially resorcinol free. The present invention is illustrated by means of some non-limiting examples below.

EXAMPLES

In these examples a thixotropic PRF adhesive system was used. The formaldehyde:resorcinol:phenol molar ratio of the PRF resin component of said system was 1.5:1.5:1.0. At 25° C., said resin component had a pH of 8 and a solid content (measured after 3 h at 100° C.) of 57%. Viscosity value (Brookfield LVT sp4) at 3 rpm was 14 Pas, 5.6 Pas at 12 rpm, and 2.6 Pas at 60 rpm. The composition of the hardener used is given below in Table I, whereby the percentages are based on the total weight of the hardener:

TABLE I

| Formaldehyde | 45% |
|---|---|
| Olive stone flour | 6% |
| Methanol | 4% |
| Thickener | 8% |
| Water | 37% |

Example 1

In this example two different cure promoter compositions, A and B, formulated according to the present invention, were used. The compositions of the cure promoter compositions are given in Table II below.

TABLE II

| | weight-% based on the total weight of the cure promoter composition | |
|---|---|---|
| Component | cure promoter composition A | cure promoter composition B |
| Water | 85% | 81% |
| Sodium carbonate | 12% | 18% |
| Sodium hydroxide (45% in water) | 3% | 1% |

In a first experiment two spruce wood blocks (32×5.5×2.0 cm), having a moisture ratio of 12%, were agglutinated. The surfaces to be joined were both treated with cure promoter composition A at an ambient temperature of 20° C. The amount of cure promoter composition used was 35 g/m² wood block surface. Directly after this treatment about 300 g/m² of the PRF adhesive was applied. The surfaces were pressed together for 40 minutes, at a temperature of 20° C. and a relative humidity of 65%, with a pressure of 700 kPa. This experiment was repeated twice using the same experimental conditions, except that in the second experiment the surfaces were pressed together for 60 minutes, and in the third experiment for 90 minutes. After pressing the wood blocks were cut apart by means of a chisel, and the wood failure percentages were determined; these percentages are given in Table III below.

Example 2

The agglutinations in Example 1 were repeated, except that cure promoter composition B was used. After pressing the wood blocks were likewise cut apart by means of a chisel, and the wood failure percentages were determined; these percentages are given in Table III below.

Example 3

The agglutinations in Example 1 were repeated, except that no cure promoter composition was used, i.e. Example 3 is a reference example. After pressing the wood blocks were cut as in the previous examples, and the wood failure percentages were likewise determined. Again the obtained percentages are given in Table III below.

TABLE III

| | Press time 40 minutes | Press time 60 minutes | Press time 90 minutes |
|---|---|---|---|
| Example 1 | 75% | 70% | 50% |
| Example 2 | 50% | 90% | 95% |
| Example 3 | 0% | 5% | 10% |

A high percentage disrupted wood fibres indicates that the fracture appeared in the wood blocks rather in the adhesive joint, thus a higher percentage means better adhesion performance.

As can be seen from these examples the present cure promoter composition provides for excellent adhesion properties already at short press time.

Example 4

Also in this experiment two spruce wood blocks (32× 5.5×2.0 cm), having a moisture ratio of 12%, were agglutinated. However, only one of the surfaces to be joined was treated with cure promoter composition B at an ambient temperature of 20° C. The amount of cure promoter composition used was 60 g/m² wood block surface. Directly after this treatment about 200 g/m² of the PRF adhesive was applied.

The surfaces were pressed together for 50 minutes, at a temperature of 20° C. and a relative humidity of 65%, with a pressure of 700 kPa.

After this pressing operation the wood block assembly was sawn in two pieces, one of which was directly cut apart by means of a chisel, while the other one was cut apart twenty-four hours later, again by means of a chisel; the wood failure percentages were determined at each occasion; these percentages are given in Table V below.

Example 5

The agglutination in Example 4 was repeated, except that cure promoter composition C, formulated according to Table IV below, was used. After pressing the wood block was sawn and cut apart by means of a chisel as in Example 4, and the wood failure percentages were determined, and the obtained percentages are given in Table V below.

TABLE IV

| Component | weight-% based on the total weight of the cure promoter composition cure promoter composition C |
|---|---|
| Water | 66.7% |
| Potassium carbonate | 33.3% |

Example 6

The agglutination in Example 4 was repeated, except that no cure promoter composition was used. After pressing the wood block was sawn and cut apart by means of a chisel as in Example 4, and the wood failure percentages were deter-mined, and the obtained percentages are given in Table V below.

TABLE V

| | After pressing for 50 minutes | twenty-four hours later |
|---|---|---|
| Example 4 | 20% | 85% |
| Example 5 | 20% | 65% |
| Example 6 | 0% | 0% |

As can be seen from these examples the present cure promoter composition provides for excellent adhesion properties, particularly after having completed the curing subsequent to the press operation, even when only applied to one of the surfaces to be agglutinated.

Example 7

In this experiment two spruce wood blocks (32×5.5×2.0 cm), having a moisture ratio of 12%, were agglutinated. The surfaces to be joined were both treated with cure promoter composition B at an ambient temperature of 20° C. The amount of cure promoter composition used was 60 g/m² wood block surface. Directly after this treatment about 200 g/m² of the PRF adhesive was applied. The surfaces were pressed together for 110 minutes, at a temperature of 20° C. and a relative humidity of 65%, with a pressure of 700 kPa. This experiment was repeated twice. After pressing the wood blocks were cut apart by means of a chisel, and the wood failure percentages were determined; these percentages are given in Table VI below, labelled "Spruce I" and "Spruce II".

These experiments were repeated, the only exception being that pine wood blocks were used instead of spruce wood blocks. After pressing the wood blocks were cut apart by means of a chisel, and the wood failure percentages were determined; these percentages are given in Table VI below, labelled "Pine I" and "Pine II".

Example 8

The experiments in Example 7 were repeated, except that the cure promoter was a 12.5 weight-% ammonia solution (cf. EP 493,010). After pressing the wood blocks were cut apart by means of a chisel, and the wood failure percentages were determined; these percentages are given in Table VI below, labelled "Spruce I", "Spruce II", "Pine I" and "Pine III".

TABLE VI

| | Spruce I | Spruce II | Pine I | Pine II |
|---|---|---|---|---|
| Example 7 | 55% | 30% | 65% | 65% |
| Example 8 | 5% | 0% | 0% | 5% |

Evidently the present cure promoter composition provides for improved adhesion properties in relation to prior art cure promoters.

The foregoing describes the invention including preferred forms and examples thereof. Alternations and variations to the method and composition of the invention as will be apparent to those skilled in the art are intended to be incorporated in the scope hereof, as defined in the following claims.

We claim:

1. A method of joining cellulosic fibre-containing surfaces, comprising the steps of treating at least one of said surfaces with a cure promoter composition comprising a carbonate and a water retaining and viscosity regulating agent, and thereafter applying an adhesive comprising a phenolic, phenol-resorcinol or resorcinol resin based adhesive system and contacting the surfaces.

2. A method according to claim 1, wherein the water retaining and viscosity regulating agent is polyvinyl alcohol, hydroxy ethyl cellulose, carboxy methyl cellulose, ethylene glycol, polyethylene glycol, propylene glycol, polypropylene glycol, or a combination thereof.

3. A method according to claim 1, wherein the cure promoter composition additionally comprises a base.

4. A method according to claim 1, wherein the surface treated with the cure promoter composition is a surface of a wood-based panel.

5. A method according to claim 1, wherein the surface treated with the cure promoter composition is a surface of a paper or a paperboard.

6. A method of joining cellulosic fibre-containing surfaces, comprising the steps of treating at least one of said surfaces with a cure promoter composition comprising a carbonate, said at least one surface comprising a wood-based panel, and thereafter applying an adhesive comprising a phenolic, phenol-resorcinol or resorcinol resin based adhesive system and contacting the surfaces.

7. A method according to claim 6, wherein the carbonate is a water soluble salt of carbonic acid.

8. A method according to claim 7, wherein the water-soluble salt comprises $Na_2CO_3$, $NaHCO_3$, $K_2CO_3$, $KHCO_3$, $(NH_4)_2CO3$, $NH_4HCO_3$, or a combination thereof.

9. A method according to claim 6, wherein the carbonate comprises 1,3-dioxolan-2-one or a higher homolog thereof, or a combination thereof.

10. A method according to claim 6, wherein the cure promoter composition additionally comprises a base.

11. A method according to claim 10, wherein the base is an alkali.

12. A method according to claim 11, wherein the amount of base is up to about 30 percent by weight, based on the total weight of the cure promoter composition.

13. A method according to claim 6, wherein the adhesive system is cured at a temperature of 15-80° C.

14. A method according to claim 6, wherein the adhesive system is based on phenol-resorcinol, or resorcinol resin.

15. A method according to claim 6, wherein the cure promoter composition is substantially resorcinol free.

16. A cure promoter composition for a phenolic, phenol-resorcinol, or resorcinol resin based adhesive system, comprising between 66.7 and 85 weight & water, a water soluble salt of carbonic acid, a water retaining a viscosity regulating agent, and a base.

17. A cure promoter composition according to claim 16, wherein the water soluble salt is $Na_2CO_3$, $NaHCO_3$, $K_2CO_3$, $KHCO_3$, $(NH_4)_2CO_3$, $NH_4HCO_3$ or a combination thereof.

18. A cure promoter composition according to claim 16, wherein the cure promoter composition is substantially resorcinol.

19. A cure promoter composition according to claim 16, wherein the base is an alkali.

20. A cure promoter composition according to claim 16, wherein the amount of base is up to about 30 percent by weight, based on the total weight of the cure promoter composition.

21. A cure promoter composition according to claim 16, wherein the water retaining and viscosity regulating agent is polyvinyl alcohol, hydroxy ethyl cellulose, carboxy methyl cellulose, ethylene glycol, polyethylene glycol, propylene glycol, polypropylene glycol, or a combination thereof.

22. A fluid cure promoter composition for a phenolic, phenol-resorcinol, or resorcinol resin based adhesive system, comprising a water soluble salt of carbonic acid, a water retaining and viscosity regulating agent, and a base.

23. A cure promoter composition according to claim 22, wherein the water soluble salt is $Na_2CO_3$, $NaHCO_3$, $K_2CO_3$, $KHCO_3$, $(NH_4)_2CO_3$, $NH_4HCO_3$, or a combination thereof.

24. A cure promoter composition according to claim 22, wherein the cure promoter composition is substantially resorcinol free.

25. A cure promoter composition according to claim 22, wherein the base is an alkali.

26. A cure promoter composition according to claim 25, wherein the amount of base is up to about 30 percent by weight, based on the total weight of the cure promoter composition.

27. A cure promoter composition according to claim 22, wherein the water retaining and viscosity regulating agent is polyvinyl alcohol, hydroxy ethyl cellulose, carboxy methyl cellulose, ethylene glycol, polyethylene glycol, propylene glycol, polypropylene glycol, or a combination thereof.

* * * * *